US012654256B2

(12) United States Patent     (10) Patent No.:   US 12,654,256 B2

Morgante                 (45) Date of Patent:      Jun. 16, 2026

---

(54) APPARATUS AND METHOD FOR REMOVING AT LEAST ONE PORTION OF AT LEAST ONE COATING SYSTEM PRESENT IN A MULTI-GLAZED WINDOW MOUNTED ON A STATIONARY OR MOBILE OBJECT

(71) Applicant: AGC GLASS EUROPE, Louvain-la-Neuve (BE)

(72) Inventor: Eric Morgante, Gosselies (BE)

(73) Assignee: AGC GLASS EUROPE, Louvain-la-neuve (BE)

( * ) Notice: Subject to any disclaimer, the term of this patent is extended or adjusted under 35 U.S.C. 154(b) by 247 days.

(21) Appl. No.: 17/998,970

(22) PCT Filed: May 21, 2021

(86) PCT No.: PCT/EP2021/063612

§ 371 (c)(1),
(2) Date: Nov. 16, 2022

(87) PCT Pub. No.: WO2021/239603

PCT Pub. Date: Dec. 2, 2021

(65) Prior Publication Data

US 2023/0173616 A1     Jun. 8, 2023

(30) Foreign Application Priority Data

May 26, 2020    (EP) .................................... 20176603

(51) Int. Cl.
B23K 26/082      (2014.01)
B23K 26/362      (2014.01)
(Continued)

(52) U.S. Cl.
CPC .......... B23K 26/082 (2015.10); B23K 26/362 (2013.01); B23K 2103/54 (2018.08);
(Continued)

(58) Field of Classification Search
None
See application file for complete search history.

(56) References Cited

U.S. PATENT DOCUMENTS

| | | | | |
|---|---|---|---|---|
| 8,927,069 B1 * | 1/2015 | Estinto | .................. | C03C 17/366 |
| | | | | 216/13 |
| 10,744,539 B2 * | 8/2020 | Barclay | ................ | B23K 26/082 |

(Continued)

FOREIGN PATENT DOCUMENTS

| | | |
|---|---|---|
| EP | 1 340 585 A1 | 9/2003 |
| WO | WO 2015/050762 A1 | 4/2015 |

OTHER PUBLICATIONS

International Search Report mailed on Aug. 26, 2021 in PCT/EP2021/063612 filed on May 21, 2021 (4 pages).

*Primary Examiner* — Edward F Landrum

(74) *Attorney, Agent, or Firm* — Oblon, McClelland, Maier & Neustadt, L.L.P.

(57) ABSTRACT

An improved apparatus for removing at least one portion of at least one coating system present in a multi-glazed window including at least two glass panels alternatively separated by at least one interlayer and forming multiple interfaces; the apparatus includes a decoating device including a laser source that generates a laser beam having a specific direction and two motors configured to displace the decoating device along a plane P, defined by a longitudinal axis X and a transversal axis Y, the decoating device further includes an orientation means to control the direction of the laser beam.

15 Claims, 7 Drawing Sheets

(51) Int. Cl.
    *B23K 103/00*          (2006.01)
    *H05B 3/86*           (2006.01)
(52) U.S. Cl.
    CPC .......... *C03C 2218/328* (2013.01); *H05B 3/86*
           (2013.01); *H05B 2203/008* (2013.01); *H05B*
                              *2203/017* (2013.01)

(56)                    References Cited

U.S. PATENT DOCUMENTS

| | | | |
|---|---|---|---|
| 2003/0226835 A1* | 12/2003 | Bell ....................... | B23K 26/10 |
| | | | 219/121.61 |
| 2004/0182839 A1 | 9/2004 | Denney et al. | |
| 2006/0144834 A1 | 7/2006 | Denney et al. | |
| 2008/0000886 A1 | 1/2008 | Bell et al. | |
| 2010/0287756 A1* | 11/2010 | Briese ................. | E06B 3/67326 |
| | | | 29/795 |
| 2013/0037198 A1* | 2/2013 | Safai .................... | B23K 26/082 |
| | | | 156/359 |
| 2013/0295300 A1 | 11/2013 | Paulus | |
| 2015/0093466 A1 | 4/2015 | Estinto et al. | |
| 2015/0093554 A1 | 4/2015 | Estinto et al. | |
| 2017/0327420 A1 | 11/2017 | Schulz et al. | |
| 2018/0036839 A1 | 2/2018 | Estinto et al. | |
| 2020/0155890 A1* | 5/2020 | Casagrande ....... | A63B 21/0557 |
| 2023/0083188 A1* | 3/2023 | Dupuy ................. | B23K 26/352 |
| | | | 156/702 |

* cited by examiner

APPARATUS AND METHOD FOR REMOVING AT LEAST ONE PORTION OF AT LEAST ONE COATING SYSTEM PRESENT IN A MULTI-GLAZED WINDOW MOUNTED ON A STATIONARY OR MOBILE OBJECT

TECHNICAL FIELD

The present invention relates to an apparatus and a method for removing at least one portion of at least one coating system in a multi-glazed window.

The invention is preferably used to modify the electromagnetic properties of a multi-glazed window already mounted on a stationary object, for instance a building, or mounted on a mobile object, for instance a vehicle, a train. This modification is achieved by partially decoating a coating system included on the interior interface of the glass panels forming the multi-glazed window.

Thus, the invention concerns multiple domains where multi-glazed windows including at least one coating system are used and wherein removing part of said coating system is required.

BACKGROUND ART

A standard single-layered window has poor thermal performances. This is why most windows are now built using two or more glass panels separated by a gas and/or polymer-based interlayer. This kind of windows are is called a multi-glazed window.

A coating system is typically applied on the interface of one or several glass panels of a multi-glazed window in order to further improve the multi-glazed window properties.

This coating system can either improve the multi-glazed window insulation, reduce the amount of infrared and/or ultraviolet radiation entering the multi-glazed window and/or keep the sun's heat out of a space wherein such multi-glazed window insulation is used.

However, this type of coating systems is generally metal-based and therefore acts as a Faraday cage, preventing electromagnetic waves such as radio waves, from entering or leaving the space.

In order to improve the transmittance of a multi-glazed window containing a coating system, one can use a laser decoating system to remove at least one portion of the coating system. The total surface to be decoated is typically between 1 and 3% of the total coating system surface, in order to both improve the transmission of radio waves through the multi-glazed-window without impairing the properties of said coating system.

Preferably, to improve the transmission of a radio wave through the window, the decoating system will remove segments from the coating system and the sum of the longest sub-segment of each segment is equal to $n\lambda/2$ wherein n is a positive integer greater than zero and lambda (A) is the wavelength of the radio wave. It is necessary to have a wide band frequency selective surface in order to ensure the transmission of waves of different frequencies through the multi-glazed window, typically between 2 GHz and 100 Ghz. For instance, the decoating system can be configured to remove a segment of a length greater than 400 mm and a width between 10 and 100 μm.

Preferably, for some applications such as toll communication systems, 4G and/or 5G receptors and transmitters, a small decoating portion is desired instead of a large decoating portion. For instance, a small decoating portion has typically a length less than 400 mm.

A simple approach to solve this problem of RF energy reflection is to remove a portion 13 of the coating system 12. This approach, however, reduces the solar control benefits offered by the multi-glazed window. Moreover, for multi-glazed window located inside the building, the vehicle or the car, the decoated region would be unacceptably large. On top of that, the transition between the decoated portion and the coating itself is eye-visible and usually non-accepted by users.

Another solution has been to cut lines in the coating system to create a surface which is frequency selective: it has relatively high reflectivity/absorbance for solar energy but relatively low reflectivity/absorbance in the RF region of the electromagnetic spectrum. The cutting may be performed by laser ablation and the spacing of the slits is chosen to provide selectivity at the desired frequency.

To improve the transmittance of said multi-glazed window, WO 20200/050762 describes an apparatus comprising a laser light source and a lens array configured to focus said laser light source on a coating system of a multi-glazed window. Said apparatus is mounted on suction pads to secure said apparatus on said multi-glazed window. Said apparatus also comprises at least two motors configured to move said laser along rails along the X and Y axis. Said laser is capable of scribing a grid shape on said coating system to improve the electromagnetic transmission of said multi-glazed window.

However, said laser is always focused on the internal surface of the second glass panel in the multi-glazed window. In fact, this apparatus is only calibrated for a single type of double-glazed window being two glass panels separated by a spacer creating a space filled with gas, where the coating system is positioned on the internal interface of the window. Hence, it is not possible to use this apparatus to other types of windows where the glass thickness is different or where the coating system is applied on a different interface.

In another domain, U.S. Pat. No. 6,559,411 describes an apparatus for laser scribing a tin oxide layer coated on a glass panel substrate.

A predetermined scribing is formed on the tin oxide layer by focusing a laser on said tin oxide layer and by displacing said glass panel substrate by a conveyor along the X or Y axis. Moreover, the position of the laser is adjusted in the Z direction during the laser scribing to maintain the focusing on said tin oxide layer.

However, this focusing requires a precise and complete understanding of the glass panel substrate including the thickness of each layer and the position of said tin oxide layer as well as the knowledge of the exact distance between the conveyor and the laser.

Laser beam of prior art is always placed and fixed orthogonally to the surface to be decoated. To create a decoated surface the decoating device must be displace along said surface using motors and complex drive systems.

Moreover, systems described in prior art are heavy to mount on a multi-glazed window due to displacement elements (rails, . . . ) and motors. The precision and the quality are hence not appropriate for small decoating portions due to movements of the apparatus. The decoating time is also long due to displacements of the laser light source especially for small decoating portion where many small displacements are needed within a short distance.

Thus, this apparatus can only be used in factories on glass panel that have just been manufactured. Hence, this apparatus cannot be used on a multi-glazed window of unknown structure, such as the number of glass panels, the number of lamination layers, the numbers of spacers, the number, nature and position of the coating system, . . . and that is already mounted on an object, for instance a building or a vehicle.

In addition, a large number of windows are already installed and are known to prevent the transmission of electromagnetic wave. Such windows cannot be replaced or be replaced without important costs. The multi-glazed windows cannot be retrieved from the object, sent back to a factory to remove the part of the coating and then, sent back to be assembled again on the object. Such situations require the decoating process to be carried out in situ, when the multi-glazed window is mounted on the object. In most cases, the structure of these multi-glazed windows and the exact position of their coating system is completely unknown. It is therefore impossible for such apparatus to focus the laser properly on the coating system.

On top of that, motors to displace the decoating device drive the drive system. Such motors needs acceleration step at the start of a line and deceleration step and the end of the decoated line in order to modify the direction. Then a further acceleration step is needed. Speed of the motors, drive systems and displacement of the decoating means during these acceleration and deceleration phases increases or decreases. The difference of the speed occurs a longer expositing time of the laser beam on the coating systems causing over-exposition, risk to burn the coating system.

Hence, the ongoing technical issue is to obtain a decoating apparatus and process that can be used on multiple kind of multi-glazed windows, wherein the position and the thickness of the glass panels and the position of the at least one coating system are not known; and that are able to work when said multi-glazed window is already mounted on an object.

SUMMARY OF INVENTION

The present invention relates to an apparatus for removing at least one portion of at least one coating system present in a multi-glazed window comprising at least two glass panels, alternatively separated by at least one interlayer, and forming multiple interfaces. The apparatus comprises a decoating device including a laser source that generates a laser beam having a specific direction. Said apparatus further comprises two motors configured to displace said decoating means along a plane (P), defined by a longitudinal axis X and a transversal axis Y. Said decoating device further comprises an orientation means configured to control the direction of said laser beam, preferably the orientation means comprises at least a rotatable mirror or a mirrors using a galvanometer based motor.

In a preferred embodiment of the present invention, said apparatus comprises a synchronization means configured to synchronize the direction of said laser source via said orientation means with the displacement of said decoating means via said motors.

In a preferred embodiment, the apparatus further comprises at least one suction means configured to detachably fix said apparatus to said multi-glazed window, preferably said suction means comprises a vacuum pad or a suction cup. The apparatus can also further comprise at least one rigid pushing means configured to stabilize the apparatus on said multi-glazed window.

Furthermore, the Apparatus of the Present Invention can Preferably Comprise:
  an optical system configured to detect on which interface said coating system is localized, and to estimate a distance between said decoating device and the detected interface; and
  a displacement means configured to control the position of said decoating device in the direction normal to the plane P.

According to the invention, said displacement device can comprise a motor and a displacement control unit, configured to control and displace said decoating device in the direction normal to the plane P. The displacement device is configured to displace the decoating device of a displacement distance equal to the difference between the estimated distance and a focus distance in order to focus said decoating device on said detected interface of at least one coating system.

Preferably, to reduce the total weight of the apparatus especially around the decoating device, said displacement device can comprise a mechanical displacement device instead of a motor. Such mechanical displacement device can comprise a screw, preferably with a high precision level, and a displacement control unit. Said displacement control unit can comprises a screen indicating the precise displacement and/or a graduated element and/or a laser.

The present invention also relates to a method for removing at least one portion of the at least one coating system present in a multi-glazed window with an apparatus according to the present invention. Said method comprises the following steps:
  A. mounting said apparatus on an external interface facing the exterior of said multi-glazed window; and
  B. removing a first portion of said coating system with said decoating device by orienting the laser beam with said orientation means and by displacing the decoating device with said motors to remove a predetermined shape from said coating system.

In a preferred embodiment, the synchronization means synchronizes the displacement of the decoating means in the plane P, the speed of the two motors and the orientation of the laser beam.

Finally, the present invention relates to the use of the above apparatus mounted to a multi-glazed window to remove at least one portion of said coating system wherein said orientation means controls the direction of said laser beam to remove at least one portion of said coating system, wherein the two motors displace the decoating device in the plane P and wherein said multi-glazed window is mounted on a stationary object (10) or on a mobile object (10).

It is noted that the invention relates to all possible combinations of features recited in the claims or in the described embodiments.

The following description relates to an building multi-glazed window but it's understood that the invention may be applicable to others fields like automotive or transportation windows.

DETAILED DESCRIPTION

Figure 1:
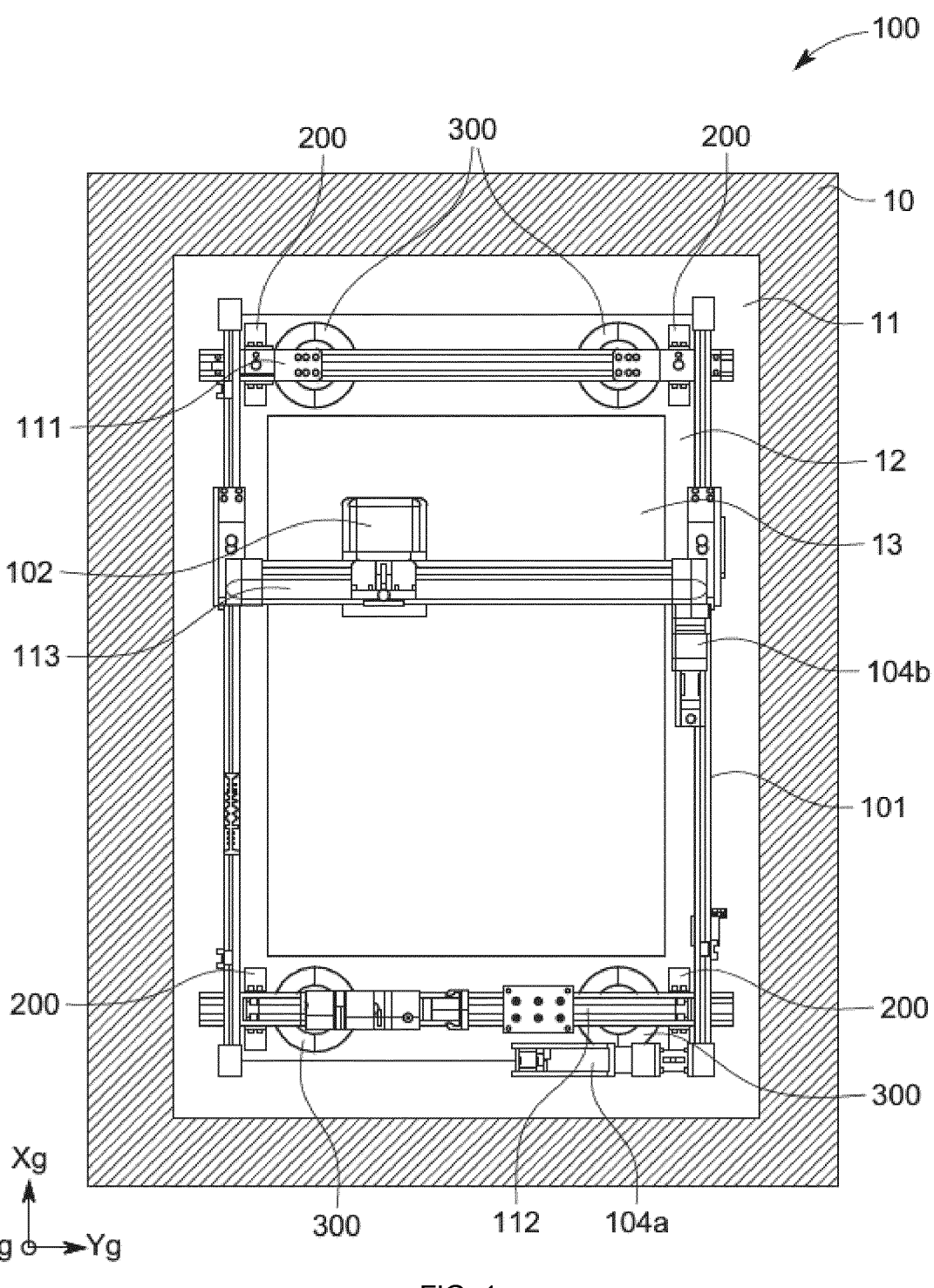
FIG. 1 is a schematic view of a part of an apparatus mounted on a multi-glazed window mounted on a stationary object according to the present invention.

It is an object of the present invention to alleviate the above described problems and to improve the electromagnetic transmission of a multi-glazed window. Especially, the object of the present invention is to improve the speed of the decoating process, the precision properties of the apparatus that can be used on multi-glazed windows in situ.

Another advantage of the present invention is to minimize risk of damage of a coating system on a multi-glazed window to be decoated.

According to a first aspect of the invention, the invention relates to an improved apparatus 100 for removing at least one portion 13 of at least one coating system 12 present in a multi-glazed window 11. The multi-glazed window comprises at least two glass panels 31, 32, alternatively separated by at least one interlayer 33, forming multiple internal P2, P3 and external P1, P4 interfaces.

Said apparatus 100 comprises a decoating device 101 including a laser source that generates a laser beam 103 having a specific direction. Preferably, said decoating device can comprise a lens array configured to focus said laser source at a focus distance. Said apparatus 100 also comprises two motors 104a, 104b configured to displace said decoating means along a plane (P), defined by a longitudinal axis X and a transversal axis Y.

Said decoating device further comprises an orientation means 104 configured to control the direction of said laser beam 103. In this way, the orientation means can orientate the laser beam in order to minimize the time spent by the laser beam at a specific location of the coating system especially during acceleration and deceleration phases of the displacement of the decoating device displaced by said motors. The laser beam scans the portion to be decoated thanks to this orientation means faster than the displacement of the decoating device. Thus, the combination of the displacement of the decoating device and the orientation of the laser beam is able to rapidly decoat a coated portion 13 of a coating system. The orientation of the laser beam permits to have substantially the same exposition time on the coating systems even during acceleration and deceleration phases of the motors.

The invention permits to very fast remove a portion of a coating system, for instance to improve the electromagnetic transmission of a multi-glazed window.

Thus, the apparatus of the invention can be used to improve the electromagnetic properties of a multi-glazed window already mounted on a stationary object, for instance building, or on a mobile object, for instance a vehicle, a train in a very fast way.

Preferably, said apparatus comprises a synchronization means configured to synchronize the direction of said laser source via said orientation means with the displacement of said decoating means via said motors. The synchronization means permits to minimize the overheat and the over-exposition of the laser beam on the coating system. Displacement on plane P of the decoating device and the orientation of the laser beam permits to accelerate the decoating time thanks to a synchronization between displacement and orientation. The decoating time can be about five time faster for the same shape and same size of decoating compared to apparatus without a synchronization means. This synchronization can depend on the shape of the decoating. In one embodiment according to the present invention, the decoating device is displaced to decoat a line and the orientation means orients the laser beam along the same direction than the lane to minimize the over-exposition.

Preferably, said orientation means may comprise at least a rotatable mirror or a mirror using a galvanometer based motor, to provide a light and fast orientation of the laser beam and to control and manage such orientation In one embodiment, in order to stabilize, i.e. to avoid any unwanted movement during the decoating process and to maintain a defined distance between the apparatus and a multi-glazed window, the apparatus of the present invention can preferably comprises at least one rigid pushing means configured to stabilize the apparatus on said multi-glazed window. The apparatus can be mounted in any placed of an external interface of the multi-glazed window but also when the apparatus is mounted to one location the decoating device can be fastened at different location on the apparatus allowing to be very efficient and covering a large portion to be decoated.

The apparatus may comprise at least one suction means to detachably fix said apparatus to said multi-glazed window, preferably said suction means comprises a vacuum pad or a suction cup. The apparatus can therefore be fixed on and detach from the in situ mounted multi-glazed window to achieve decoating at different locations.

It has been found that the apparatus of the present invention can be further improved by comprising a focusing means.

In one embodiment, the apparatus and/or the decoating device can comprise a focusing means to adjust the focus of the laser beam on the coating to be decoated even if the structure of said multi-glazed window is unknown.

Indeed, to work correctly, the laser source of a decoating system is positioned at a sufficient distance in the Z-axis from the window in order to avoid any degradation during the movements of the decoating device. Typically, the laser is positioned at a working distance of about 160 mm or 250 mm from the window.

In order to correctly decoat a coating system, the laser source must be precisely focused onto the targeted coating system. Therefore, the position of the coating system must be known with a precision at least three times smaller than the depth of field of the decoating device. The depth of field corresponds to the distance around the focal point of a focused laser beam where the laser beam diameter is considered constant. This distance depends greatly of the laser beam characteristics and the optics used for focusing said laser beam. Typically, the depth of field is around 0.5 mm, which means that the precision on the focus position of the decoating device should be around 0.1-0.2 mm.

Considering the variable distance between the support structure and the windows and the required precision, the invention proposes to adapt in automatic mode or with precise manual mechanics device the distance between the decoating device and windows before the decoating process to focus the laser on the coating system.

Rigid pushing means 200 and/or suction means 300 can fix the distance between the external surface and the apparatus. Then the decoating device 102 can move in Z axis to focus.

Alternatively, to increase to quality of the decoating and to ensure a correct focusing of the laser beam, the apparatus can comprises an optical system configured to detect on which interface said coating system is localized and to estimate a distance between the decoating device and the detected interface; and a displacement means configured to control the position of said decoating device in the direction normal to the plane P.

Moreover, in a preferred embodiment, the apparatus further comprises some means for the decoating device to focus on the appropriate interface of the multi-glazed window to achieve the necessary decoating. Therefore, the apparatus of the present invention can further comprise:

an optical system configured to detect on which interface said coating system is localized, and to estimate a distance between said decoating device and the detected interface; and a displacement means configured to control the position of said decoating device in the direction normal to the plane P.

In the embodiment, wherein the apparatus is mounted to the multi-glazed window in the plane P, the decoating device is also able to move in the direction normal to plane P, i.e. the Z axis, to adapt the focusing point of the laser beam to the coating system. This further allows to limit the required power of the decoating device to decoat the coating system and mitigate safety issues and the risk of degradation of other elements of the multi-glazed windows.

To minimize the weight of the apparatus, especially near the decoating device, the displacement of the decoating device within the apparatus can be made mechanically. Suitable mechanical displacement means can comprises a worm, a slide or any other mechanical elements able to displace mechanically the decoating device in order to adapt the focusing point.

In some embodiments, the displacement of the decoating device within the apparatus can be made automatically. Hence said displacement device comprises a motor and a displacement control unit, configured to control and displace said decoating device in the direction normal to the plane P.

When present, the displacement device is configured to displace the decoating device of a displacement distance equal to the difference between the estimated distance and a focus distance allowing the decoating device to focus on the detected interface of the coating system.

According to a second aspect, the invention concerns a method for removing at least one portion of at least one coating system present in a multi-glazed window by the apparatus described in the first aspect of the invention. The window extends along a plane Pg, defined by a longitudinal axis Xg and a transversal axis Yg and provides two external interfaces and at least two internal interfaces. The apparatus will be mounted on an interface facing the exterior of the multi-glazed window also referred to as external interface and the coating system is provided on an interface facing the inside of the multi-glazed window also referred to as an internal interface. In case of a multi-glazed window with two glass panels, external interfaces are referred to P1 and P4 while internal interfaces to P2 and P3. The method comprises the following steps:

A. mounting said apparatus on an interface, P1, facing the exterior of said multi-glazed window and B. removing a first portion 13 of said coating system with said decoating device 101 by orienting the laser beam 103 with said orientation means 104 and by displacing the decoating device with said motors to remove a predetermined shape from said coating system.

To minimize the decoating time, the synchronization means synchronize, during step B, the displacement of the decoating means in the plane P, the speed of each of the two motors and the orientation of the laser beam.

When the apparatus further comprises an optical system and a displacement means, the method can further comprises, between steps A and B, the following steps:

C. localizing by said optical system the working internal interface wherein said coating system needs to be at least partially removed, and, and D. estimating a distance between said decoating device and said working internal interface; and E. moving said decoating device in the direction normal to the plane P to focus said decoating device laser beam on said working internal. interface.

According to a third aspect of the invention, the invention relates to the use of an apparatus according to the first aspect of the invention. The invention is directed to the use 103 of the apparatus mounted to a multi-glazed window to remove at least one portion 13 of the coating system 12, wherein said orientation means (104) controls the direction of said laser beam (103), wherein the two motors displace the decoating device in the plane P and wherein said multi-glazed window is mounted on a stationary object (10) or on a mobile object (10).

This and other aspects of the present invention will now be described in more details, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

For a better understanding, the scale of each member in the drawing may be different from the actual scale. In the present specification, a three-dimensional orthogonal coordinate system in three axial directions (X axis direction, Y axis direction, Z axis direction) is used, the longitudinal direction of the multi-glazed window is defined as the X direction, the transversal direction is defined as the Y direction, and the height is defined as the Z direction. The displacement of the apparatus versus the multi-glazed window is achieved within the Z direction. The narrowing of the distance between the apparatus and the multi-glazed window is defined as the +Z axis direction, and increasing the distance is achieved the opposite direction and is defined as the −Z axis direction.

Figure 2:
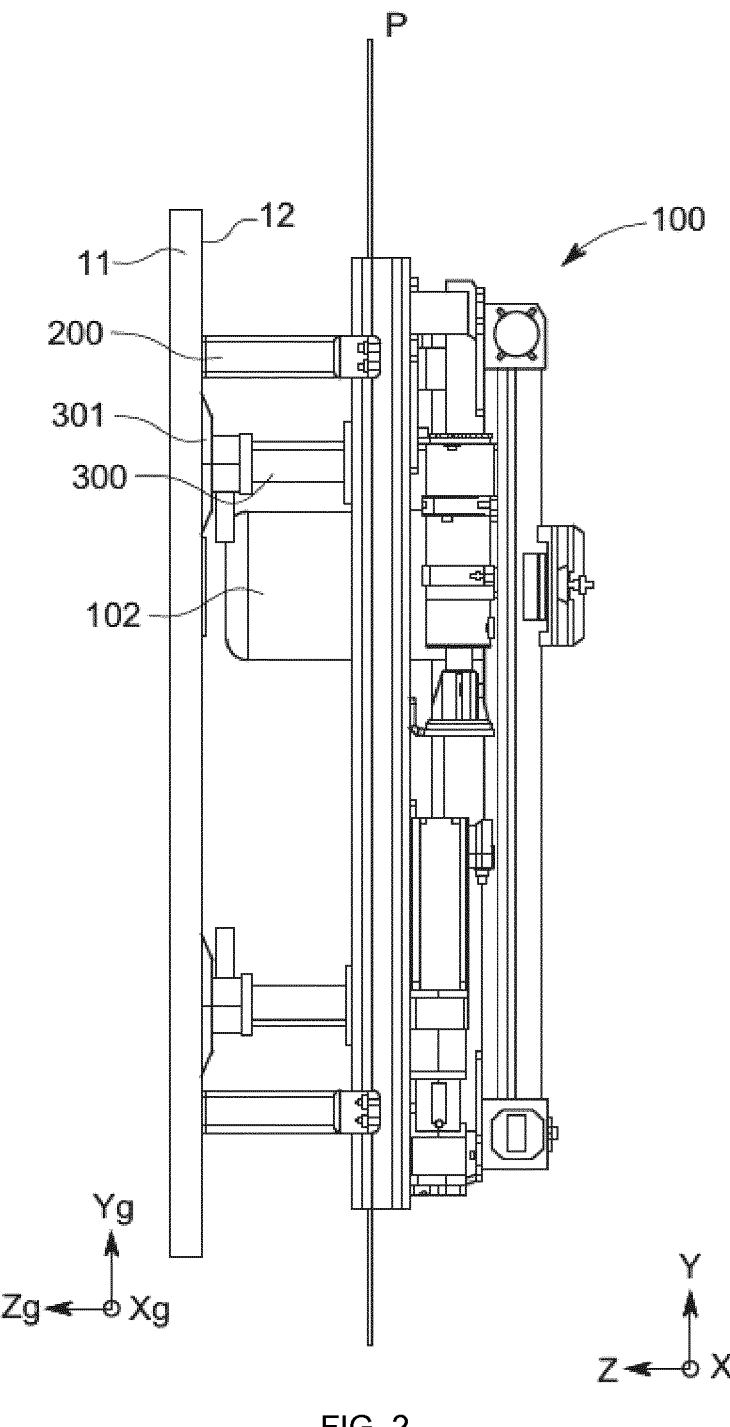
FIG. 2 is a schematic side view of an apparatus mounted on a multi-glazed window according to an exemplifying embodiment of the present invention.
Figure 3:
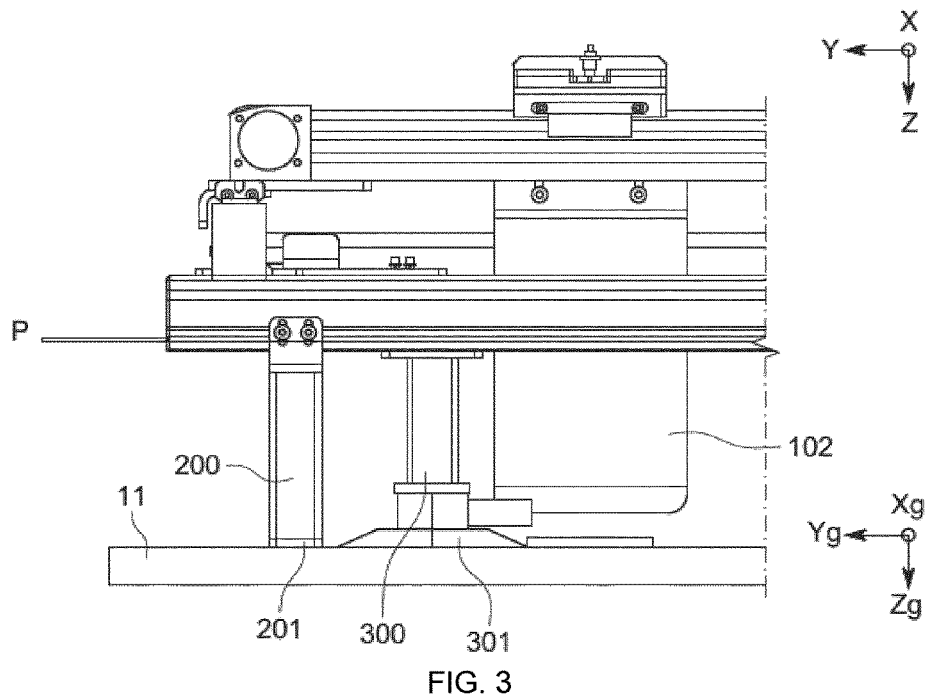
FIG. 3 is a schematic side view of an apparatus detachably fixed on a multi-glazed window according to an exemplifying embodiment of the present invention.
Figure 4:
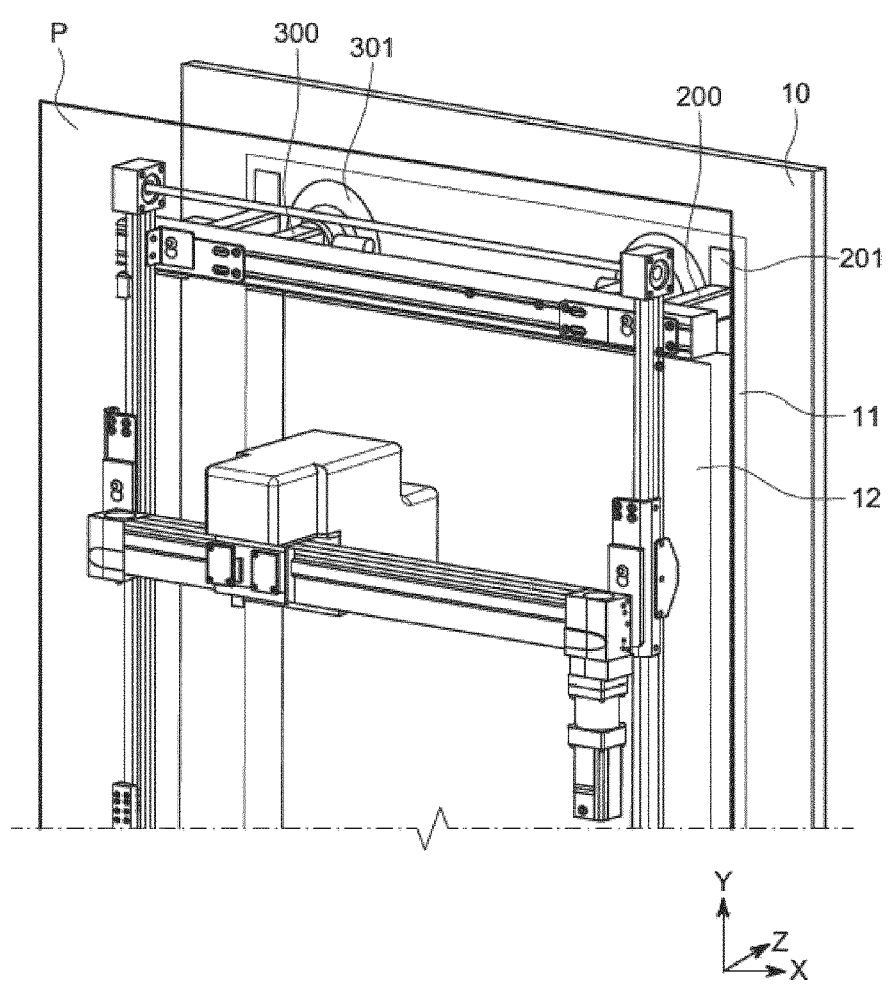
FIG. 4 is a schematic 3D view of an apparatus mounted on a multi-glazed window according to an exemplifying embodiment of the present invention.
Figure 5:
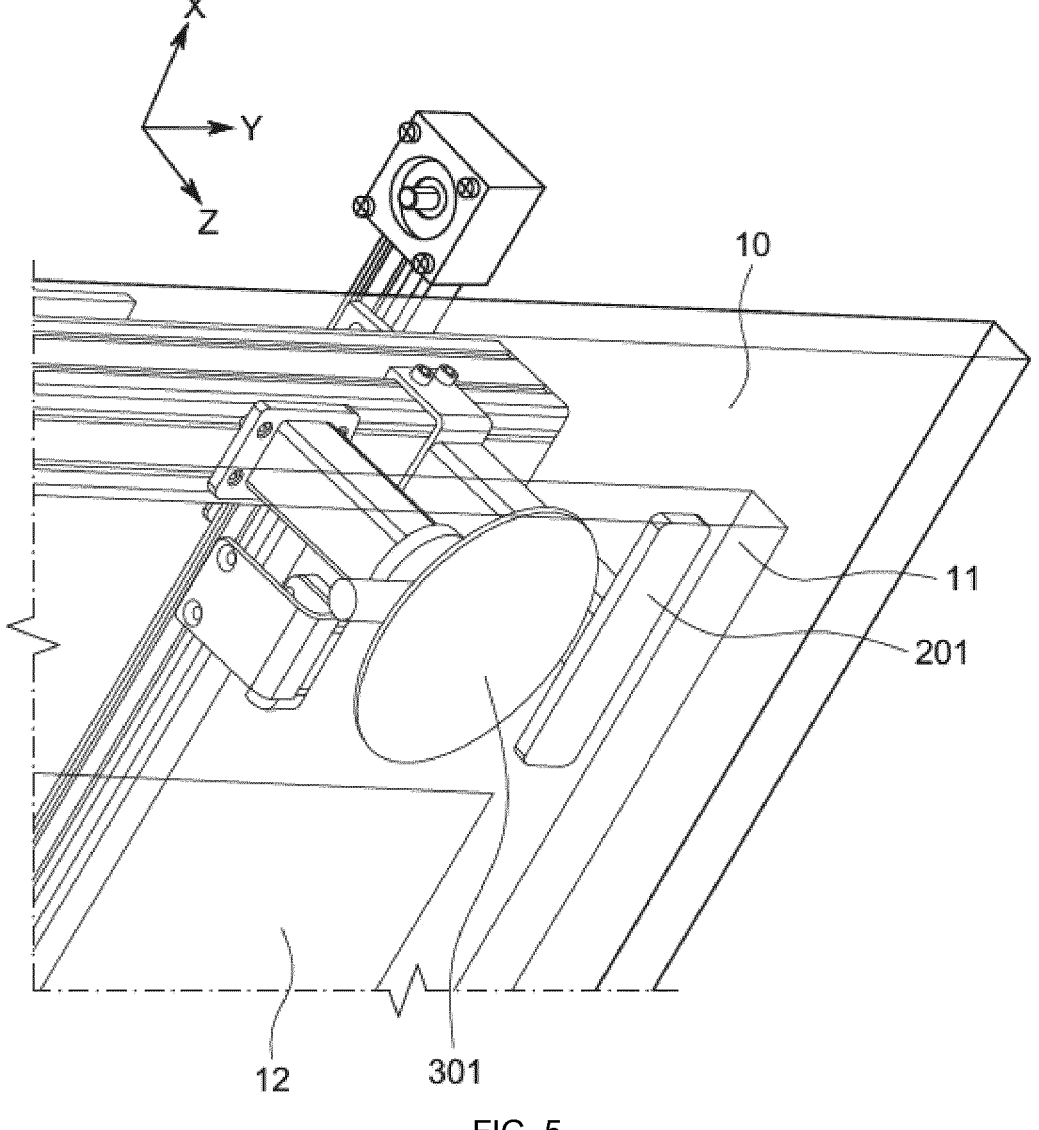
FIG. 5 is a schematic 3D view of a part of an apparatus mounted a multi-glazed window according to an exemplifying embodiment of the present invention.

FIG. 1 and FIG. 2 show a part of an apparatus 100 mounted on a multi-glazed window 11 mounted by any known means on a stationary object 10, such as a house, an office, a building, etc or on a mobile object 10, such as a vehicle, a train, a boat, etc meaning that the multi-glazed window is in a in situ location. A coating system 12 with a portion to be decoated 13 is placed on an interface of the multi-glazed window. The apparatus comprises suctions means 300 and rigid pushing means 200. The apparatus also comprises two motors 104*a*, 104*b* to displace the decoating device 102. The decoating device 102 is fastened on a first rail 113 and one of the two motors displace the decoating device along this first rail 113. The first rail is mounted on at least a second rail 101 and the second motor displace the first rail along the second rail allowing to displace the decoating device along the plane P.

The multi-glazed window 11 can be a multi-glazed window used as a window to close an opening of the stationary object 10 or to close an opening of the mobile object 10.

Said multi-glazed window 11, extends along a plane Pg, defined by a longitudinal axis Xg and a transversal axis Yg, and has interfaces substantially parallel to plane Pg. Rigid pushing means and/or suctions means permits to minimize the difference between plane Pg and plane P.

The multi-glazed window 11 can be at least partially transparent to visible waves for visibility, and natural or artificial light. The multi-glazed window is made of multiple panels separated by at least one interlayer, forming multiple interfaces. The panels therefore can be separated by a space filled with gas or by a polymeric interlayer.

In some embodiments, the multi-glazed window 11 can comprise at least two glass panels separated by a spacer allowing to create a space filled by a gas like Argon to improve the thermal isolation of the multi-glazed window, creating an insulating multi-glazed window. The invention is not limited to apparatus for use on multi-glazed window having two panels. The apparatus and method of the present invention are suitable for any multi-glazed window such as double, triple glazed windows.

In another embodiments, the glass panel can be a laminated multi-glazed window such as those to reduce the noise and/or to ensure the penetration safety. The laminated glazing comprises panels maintained by one or more interlayers positioned between glass panels. The interlayers are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

Said panels of the multi-glazed window can be made of glass, polycarbonate, PVC or any other material used for a window mounted on a stationary object or on a mobile object.

Usually, the material of the panels of multi-glazed window 11 is, for example, soda-lime silica glass, borosilicate glass, aluminosilicate glass or other materials such as thermoplastic polymers or polycarbonates which are especially known for automotive applications. References to glass throughout this application should not be regarded as limiting.

The multi-glazed window 11 can be manufactured by a known manufacturing method such as a float method, a fusion method, a redraw method, a press molding method, or a pulling method. As a manufacturing method of the multi-glazed window 11, from the viewpoint of productivity and cost, it is preferable to use the float method.

Each panel can be independently processed and/or colored, . . . and/or have different thickness in order to improve the aesthetic, thermal insulation performances, safety, . . . . The thickness of the multi-glazed window 11 is set according to requirements of applications.

The multi-glazed window 11 can be any known window used in situ. For example, the multi-glazed window 11 can be processed, ie annealed, tempered, . . . to respect the specifications of security and anti-thief requirements. The window can independently be a clear glass or a colored glass, tinted with a specific composition of the glass or by applying an additional coating or a plastic layer for example. The window can have any shape to fit to the opening such as a rectangular shape, in a plan view by using a known cutting method. As a method of cutting the multi-glazed window 11, for example, a method in which laser light is irradiated on the surface of the multi-glazed window 11 to cut the multi-glazed window 11, or a method in which a cutter wheel is mechanically cutting can be used. The multi-glazed window can have any shape in order to fit with the application, for example a windshield, a sidelite, a sunroof of an automotive, a lateral glazing of a train, a window of a building, . . . .

FIG. 1 shows a rectangular shape of the multi-glazed window. Rectangle includes not only a rectangle or a square but also a shape obtained by chamfering corners of a rectangle or a square. The shape of the multi-glazed window 11 in a plan view is not limited to a rectangle and may be a trapeze, especially for a windshield or a backlite of a vehicle, a triangle, especially for a sidelight of a vehicle, a circle or the like.

In addition, the multi-glazed window 11 can be assembled within a frame or be mounted in a double skin façade, in a carbody or any other means able to maintain a multi-glazed window. Some plastics elements can be fixed on the multi-glazed window to ensure the tightness to gas and/or liquid, to ensure the fixation of the multi-glazed window or to add external element to the multi-glazed window. In some embodiments, a masking element, such as an enamel layer, can be added on part of the periphery of the multi-glazed window.

The multi-glazed window 11 can be flat or curved according to requirements by known methods such as hot or cold bending. In case of curved multi-glazed window, plane Pg is defined locally by Xg- and Yg-axis substantially tangential to the surface and in the whole surface of the window by three axis, Xg-, Yg- and Zg-axis.

At least one coating system 12 is present on one interface of the multi-glazed window 11. This coating system 12 generally uses a metal-based layer and infrared light is highly refracted by this type of layer. Such coating system 12 is typically used to achieve a to a low-energy multi-glazed window.

In some embodiment, the coating system 12 can be a heatable coating applied on the multi-glazed window to add a defrosting and/or a demisting function for example and/or to reduce the accumulation of heat in the interior of a building or vehicle or to keep the heat inside during cold periods for example. Although coating system 12 are thin and mainly transparent to eyes.

Usually, the coating system 12 is covering most of the surface of the interface of the multi-glazed window 11.

The coating system 12 can be made of layers of different materials and at least one of these layers is electrically conductive. In some embodiments, for example in automotive windshields, the coating system 12 can be electrically conductive over the majority of one major surface of the multi-glazed window. This can causes issues such as heated point if the portion to be decoating is not well designed.

A suitable coating system 12 is for example, a conductive film. A suitable conductive film, is for example, a laminated film obtained by sequentially laminating a transparent dielectric, a metal film, and a transparent dielectric, ITO, fluorine-added tin oxide (FTO), or the like. A suitable metal film can be, for example, a film containing as a main component at least one selected from the group consisting of Ag, Au, Cu, and Al.

Such coating systems 12 are low in reflectance for RF radiation meaning that RF radiation are mostly transmitted through the material. In contrast, high in reflectance for RF radiation means that RF radiation are mostly reflected on the surface of the material and/or absorbed by the material and the attenuation is at level of 20 decibels (dB) or more. Low in reflectance means an attenuation at level of 10 decibels (dB) or less. The coating system which is high in reflectance for RF radiation means that the coating system is non-transmitting to RF radiation. Typically, the coating system 12 has an emissivity of not more than 0.4, preferably equals to or less than 0.2, in particular equals to or less than 0.1, equals to or less than 0.05 or even equals to or less than 0.04.

The coating system may comprise a metal based low emissive coating system. Such coating systems typically are a system of thin layers comprising one or more, for example two, three or four, functional layers based on an infrared radiation reflecting material and at least two dielectric coatings, wherein each functional layer is surrounded by dielectric coatings. The coating system of the present invention may in particular have an emissivity of at least 0.010. The functional layers are generally layers of silver with a thickness of some nanometers, mostly about 5 to 20 nm. The dielectric layers are generally transparent and made from one or more layers of metal oxides and/or nitrides. These different layers are deposited, for example, by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

Moreover, if the multi-glazed window presents two coating systems applied on two different interfaces, a first coating needs to be decoated before the second one. For example, the decoating device decoats a portion on the closest coating system and then decoats the second one. The focus point is adapted to be on the correct coating system. Preferably, to avoid to modify the decoating of the closest coating, the decoating device decoats a portion on the farthest coating system and then decoats the closest one. The needed power to decoat the farthest one is higher than the needed power to decoat the closest one and risks to degrade the decoated shape of the portion on the closest one if this one is done before the farthest coating.

FIG. 1 illustrates a decoated portion or a portion to be decoated 13. Dimensions and shape of the decoated portion depend on the desire application.

The decoated portion 13 can be a full decoated area meaning that the coating system is removed in this entire portion.

Alternatively, to minimize the decoating time while keeping functionalities, such as thermal performances, of the coating system 12, the decoated portion 13 comprises decoated segments creating zones where the coating system is still present. Decoated segments can have a width between 200 nm and 50 nm and preferably between 25 nm and 35 nm forming specific designs, such as grid.

Decoated designs can depend on wanted visual aspect, desired wavelength transparency for example.

The position of the decoated portion 13 on the multi-glazed window 11 depends on the application.

The apparatus or part of the apparatus can therefore be adapted to the dimension of the portion to be decoated and/or to the dimension of the window.

In some embodiments, to avoid to unmounted and mounted in another place the apparatus, the apparatus can have telescopic elements allowing to move the decoating device in a second portion to be decoated.

FIGS. 1 to 5 illustrate a first embodiment of the present invention. FIGS. 1 to 5 show a part of an apparatus 100 mounted on a multi-glazed window 11 mounted on a stationary object 10 or on a mobile object 10. The apparatus 100 is hence used in situ, directly on a mounted multi-glazed window 11. At least a part of the apparatus 100 is mounted in front of the portion 13 to be at least partially decoated with four suction means 300.

Figure 6:
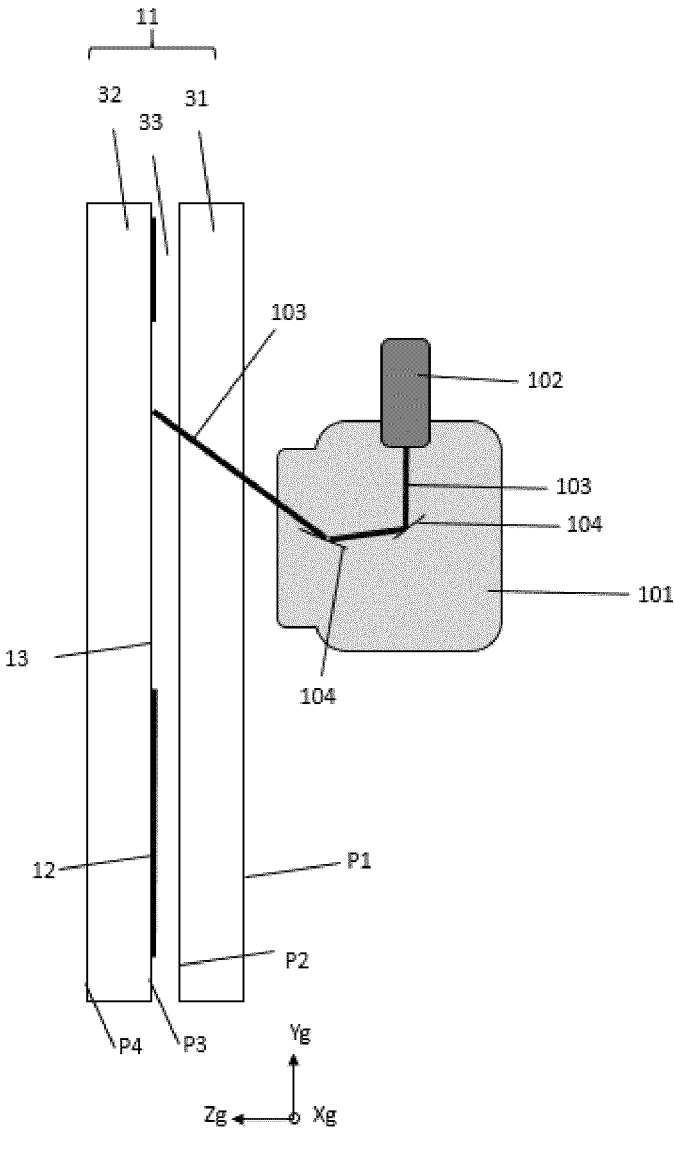
FIG. 6 is a schematic view of a decoating device having laser source with a laser beam generated by the laser source and an exemplifying embodiment of an orientation means of an apparatus according to the present invention.
Figures 7, 8:
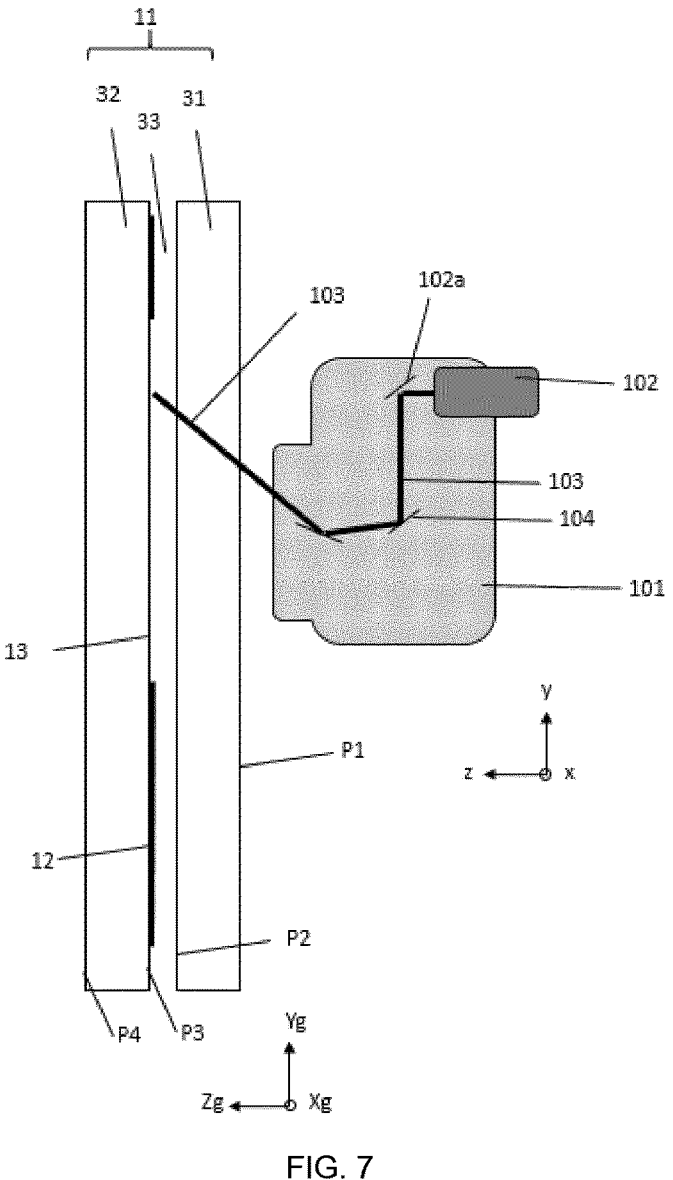
FIG. 7 is a schematic view of a laser source with a laser beam generated by the laser source and an exemplifying embodiment of an orientation means of an apparatus according to the present invention.
FIG. 8 is a schematic graph of the velocity of and the time passed by the laser beam during the decoating step according to the state of the art.

As illustrated in FIGS. 6 and 7, the multi-glazed window 11 comprises two glass panels 31, 32 separated by at least one interlayer 33, forming multiple interfaces P1, P2, P3, P4. P1 and P4 are external interfaces and P2 and P3 are internal interfaces. A coating system 12 is applied on the internal interface P3 of the glass panel 31. In other embodiments, the coating system can be added to another internal or external interfaces P1, P2 or, P4 or at least two of the internal and/or external interfaces P1, P2, P3 and/or P4.

The apparatus can be mounted from the interior or from the exterior of the object 10 to the external interface, respectively P4 or P1.

In some embodiments, two apparatus can be mounted on the same interface or on different interfaces, one is mounted from the interior while the second is mounted to the multi-glazed window from the exterior while respecting safety requirements.

The apparatus 100 can comprise suction means 300 comprising vacuum pad or suction cup to detachably fix the apparatus 100 to a surface P1 of the multi-glazed window 11.

Plane P is, in the simplest embodiment, parallel to plane Pg but in the other embodiments, these planes P and Pg are not parallel. To minimize this non-parallelism, the apparatus can comprises suctions means and/or rigid pushing means.

As illustrated in FIGS. 1 to 5, the apparatus 100 comprises four suctions means 300. Suctions means 300 are placed near corners of the part of the apparatus 100 mounted on the external interface to maximize the stability of the apparatus on the window. Two of these suction means are placed on top and one on the bottom to ensure a stability and a correct fixation required during the decoating process.

However, in some embodiment a single suction means is enough. Suctions means can have a circular contact area or any other shape such as oblong shape. In case of a non-circular suction end, preferably, the longest dimension of the contact surface is in Y direction.

To mount the apparatus to the multi-glazed window, vacuum pads can be placed against the external interface P1 and/or P4 of the multi-glazed window at a certain distance. Air is sucked from the vacuum pads and provide the required suction force. Suctions means are appropriate mounting means since they can detachably fix the apparatus to the multi-glazed window. When the apparatus is to be removed from the window, air is applied between said the suction means and said interface P1.

According to the invention, the apparatus can further comprise at least one rigid pushing means 200 to maintain the distance between the decoating device and the interface P1 of the multi-glazed window 100 and to ensure the parallelism between the decoating device and the external surface P1.

Rigid pushing means 200 can have any contact shape area in order to stabilize the apparatus. Rigid pushing means can have a pushing end in form of a base. The longest dimension is in X axis. Pushing ends can have any shape. In some embodiments, pushing ends can be fingers. In order to avoid scratches or damaged of the surface of interface of the multi-glazed window, a soft material can be added to the pushing end to soften the contact with said multi-glazed window. This soft material is at most of 3 mm and is chosen to avoid shear forces between the apparatus and said surface. Soft material can be a rubber based material of 2 mm. Preferably, the soft material has hardness of at least 70 Shores and more preferably more than 90 Shores.

Rigid pushing means can be made of metal such as steel, stainless steel, aluminum, a polymer such as aluminum reinforced polymer, or any other material able to have a rigid connection between the glass panel and the apparatus. The term rigid is understood as a pushing means with very limited flexibility and a very high bending stiffness. Preferably, the Young modulus is upper than 70 GPa.

Because the decoating device is fixed in said X- and Y-axis to said apparatus, so that the decoating device cannot move once fastened to the apparatus and so that no displacement of the decoating device is allowed along the plane P at least during the decoating period, the orientation means within the decoating device of the present invention is able to rapidly decoat a specified coated area compared to a decoating apparatus with displacement in X- and Y-axis.

As illustrated in FIGS. 6 and 7, the apparatus 100 comprises a decoating device 101 including a laser source 102 that generates a laser beam 103 having a specific direction. The specific direction is from the decoating means to the window and is defined by the angle formed between the window and the laser beam. The decoating device further comprises an orientation means 104 configured to control the direction of said laser beam 103. Thanks to the orientation means of the apparatus of the present invention and the displacement of the decoating device, the laser beam will define a working zone. The working zone is the surface that is scanned by the laser beam when the specific angle between the window and the laser beam varies during the decoating process thanks to the orientation means and the displacement of the decoating device. Maximum angles and maximal displacements define the maximum decoatable surface 13 that can be achieved by the decoating device.

The maximum decoating area is typically a rectangular with a length comprised between 50 mm to 2000 mm. Preferably, the decoating area is an area between a 100 mm×100 mm square to a 2000 mm×2000 mm square. This maximum decoating area is indeed limited by useful area of decoating provided by properties and configurations of the laser beam, such as power, depth of field and by properties and configurations of the orientation means such as orientation angles and displacements of the decoating device along rails.

The apparatus of the present invention can be made of different parts, such as rails, motors, decoating device, mounting structure, . . . , to be easily handled and transported and mounted together. The mounting step can comprise several sub steps such as assembling parts of the apparatus especially fastening the decoating device within the apparatus. The decoating device can be dissembled from the apparatus. These parts can comprise electronic materials linked to the decoating device such as a box or a backpack to facilitate the handling.

The present invention relates to a method wherein the said apparatus is mounted in step A on the external interface P1 and/or P4 and the decoating device remove in step B, a first portion 13 of the coating system 12 by orienting said laser beam 103 with said orientation means 104 and/or by displacing the decoating device. In some embodiments, the displacement or the orientation can work alone during a specific time. Preferably, both displacement and orientation are synchronized.

In some embodiments, the zone to be decoated 13 can be larger than the maximum decoating zone offered by the decoating system fixed within the apparatus mounted at a specific location of the multi-glazed window. Therefore to increase the surface of the portion to be decoated or to decoat another portion of the coating system, the decoating device needs to be displaced and placed in front of this new portion to be decoated.

As illustrated in FIGS. 1 to 4, in some embodiments according to the invention, the apparatus can comprises rails 111, 112 to fix the suction means 300 and/or rigid pushing means 200 to the apparatus on top of rails used for the displacement of the decoating device.

To mount the apparatus on the window, a first upper rail 111 is mounted on the external surface of the window with suction means and/or rigid pushing means then the first rail 101 used to displace the decoating device is fastened on this first upper rail and mounted to the external surface via the lower rail 112 then motors and the second rail are fastened with the decoating device. The last step is to connect all needed electronics.

According to the invention, the laser beam is oriented to decoat a portion of the coating system while minimize overheat and over-exposition of the laser beam on the coating system. Thus, the apparatus 100 comprises an orientation means 104 configured to control the direction of the laser beam 103 and displace its focus point on the portion of the coating system to be decoated. The laser beam is orientable in the X- and Y-axis. In contrast, the decoating device is locked on the apparatus and cannot move in, the X- and Y-axis.

As shown in FIGS. 6 and 7, in some embodiments of the invention, the orientation means 104 comprises mirrors, able to reflect and orientate the laser beam 103. The orientation means 104 make the laser beam scan and decoat a portion, of the coating system defined in X- and Y-axis.

Preferably, the orientation means comprises more than one mirror to able the laser beam to fast scan the surface to be decoated. Said mirrors can rotate to orientate the laser beam. Rotation of said mirrors can be done by actuators, mechanical elements, galvo-head or any other elements able to orientate mirrors. Suitable mirrors are a rotatable mirror or a mirror using a galvanometer based motor, deflecting a rotatable mirror or a mirror using a galvanometer based motor.

Preferably, said decoating device comprises a lens array configured to focus said laser source at a focus distance.

Preferably, the orientation means 104 comprises two rotating mirrors to be able to scan and to decoat a portion of the coating system, defined in X- and Y-axis.

In some embodiment as shown in FIG. 6, the laser source 102 generates the laser beam 103 substantially parallel to the surface of the multi-glazed window.

In some other embodiments as shown in FIG. 7, the laser source 102 generates the laser beam 103 substantially perpendicular to the surface of the multi-glazed window. In such embodiments, a fixed mirror 102a is added to orientate to laser beam 103 to a direction substantially parallel to the surface of the multi-glazed window.

In some embodiments, the decoating device 101 can move in the Z-axis in order to adapt the focus point on the coating system to be decoated. In this instance, the apparatus 100 comprises an optical system configured to detect on which interface said coating system is localized, and to estimate a distance between said decoating device and the detected interface. The decoating device can be moved in Z-axis mechanically or electronically by a manual displacement or with the help of at least a motor configured to control the position of said decoating device along a Z axis, orthogonal to the X and Y axis or orthogonal to the main surface of the multi-glazed window and a displacement control unit of said motor configured to displace said decoating device of a displacement. The orientation means can orientate the laser beam independently to the displacement in Z-axis or synchronized with said displacement to reduce the decoating time especially for curved windows.

FIG. 8 illustrates to speed S versus the time T for a decoating apparatus according to the state of the art giving the displacement D of the decoating device. Such system needs a acceleration step between the start of the motors T0 to T1 when the maximum speed Sm is achieved. At the end, the motors needs to decelerate to stop or to change direction between T2 and Tf.

The behavior occurs a longer exposition E of the laser beam on the coating systems at least during these acceleration and deceleration phases corresponding to position P0 to P1 and P2 to Pf.

Figure 9:
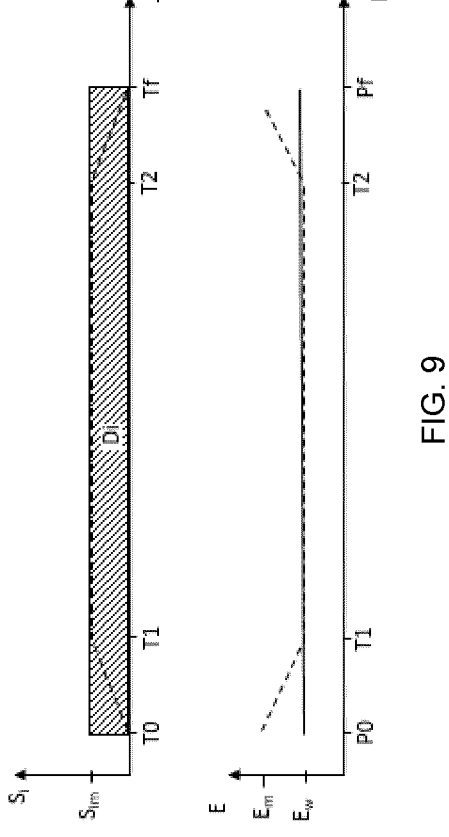
FIG. 9 is a schematic graph of the velocity of and the time passed by the laser beam at a position during the decoating step according to the present invention.

The present invention solves these issue and FIG. 9 illustrates this improvement. FIG. 9 illustrates the displacement and the speed of the laser beam during the decoating compared to state of the art (in dash line). Thanks to the orientation of the laser beam and the displacement of the decoating device, the speed Si is from T0 to Tf substantially the same corresponding to the maximum Sim. Thus, there is no acceleration or deceleration phases, the exposition time is slightly linear and constant avoiding over-exposition and overheat during at least some parts of decoating steps.

The invention claimed is:

1. An apparatus for removing at least one portion of at least one coating system present in a multi-glazed window comprising at least two glass panels alternatively separated by at least one interlayer and forming multiple interfaces, the apparatus comprising:

a decoating device comprising a laser source that generates a laser beam having a specific direction, and two motors configured to displace the decoating device along a plane (P), defined by a longitudinal axis X and a transversal axis Y;

wherein the decoating device further comprises an orientation device configured to control and change the specific direction of the laser beam while the decoating device is displaced along the plane (P), and wherein the orientation device is configured during acceleration and deceleration of the device to change the specific direction of the laser so that the laser imparts a same energy to each location on the window as when the device is displaced at maximum speed.

2. The apparatus according to claim 1, wherein the orientation device comprises at least one rotatable mirror using a galvanometer based motor.

3. The apparatus according to claim 1, further comprising at least one suction device configured to detachably fix the apparatus to the multi-glazed window.

4. The apparatus according to claim 1, further comprising at least one rigid pushing device configured to stabilize the apparatus on the multi-glazed window.

5. The apparatus according to claim 1, further comprising:

an optical system configured to detect on which interface the coating system is localized, and to estimate a distance between the decoating device and a detected interface; and a displacement device configured to control a position of the decoating device in a direction normal to a plane P.

6. The apparatus according to claim 5, wherein the displacement device comprises a third motor and a displacement control unit, configured to control and displace the decoating device in the direction normal to the plane P; and wherein the displacement device is configured to displace the decoating device a displacement distance equal to a difference between an estimated distance and a focus distance to focus the decoating device on the detected interface of the coating system.

7. The apparatus according to claim 1, further comprising at least one suction device comprising a vacuum pad to detachably fix the apparatus to the multi-glazed window.

8. The apparatus according to claim 1, further comprising at least one suction device comprising a suction cup to detachably fix the apparatus to the multi-glazed window.

9. The apparatus according to claim 1, wherein the orientation device is configured to change the specific direction of the laser beam during acceleration and deceleration of the decoating device.

10. A method for removing at least one portion of at least one coating system present in a multi-glazed window with an apparatus according to claim 1; comprising:

mounting the apparatus on an external interface (P1) of the multi-glazed window; and removing a first portion of the coating system with the decoating device by orienting the laser beam with the orientation means and by displacing the decoating device with the two motors to remove a predetermined shape from the coating system.

11. The method according to claim 10, wherein during removing a first portion of the coating system, a synchronisation means synchronises a displacement of the decoating means in the plane P, a speed of each of the two motors, and an orientation of the laser beam.

12. The method according to claim 11, wherein the apparatus is mounted on a first interface of the multi-glazed window with at least one suction means detachably fixed to the first interface.

13. The method according to claim 11, wherein the apparatus is mounted on a first interface of the multi-glazed window with at least one rigid pushing means to the first interface to stabilize and ensure parallelism between the multi-glazed window and the decoating device.

14. An apparatus for removing at least one portion of at least one coating system present in a multi-glazed window comprising at least two glass panels alternatively separated by at least one interlayer and forming multiple interfaces, the apparatus comprising:

a decoating device comprising a laser source that generates a laser beam having a specific direction;

two motors configured to displace the decoating device along a plane (P), defined by a longitudinal axis X and a transversal axis Y; and at least one rigid pushing device having a Youngs modulus greater than 70 GPa, the rigid pushing device configured to stabilize the apparatus on the multi-glazed window, wherein the decoating device further comprises an orientation device to control the specific direction of the laser beam, wherein the orientation device is configured during acceleration and deceleration of the device to change the specific direction of the laser so that the laser imparts a same energy to each location on the window as when the device is displaced at maximum speed.

15. An apparatus for removing at least one portion of at least one coating system present in a multi-glazed window comprising at least two glass panels alternatively separated by at least one interlayer and forming multiple interfaces, the apparatus comprising:

a decoating device comprising a laser source that generates a laser beam having a specific direction, two motors configured to displace the decoating device along a plane (P), defined by a longitudinal axis X and a transversal axis Y;

an optical system configured to detect on which interface the coating system is localized, and to estimate a distance between the decoating device and a detected interface; and a displacement device configured to control a position of the decoating device in a direction normal to a plane P, wherein the decoating device further comprises an orientation device to control the specific direction of the laser beam, wherein the orientation device is configured during acceleration and deceleration of the device to change the specific direction of the laser so that the laser imparts a same energy to each location on the window as when the device is displaced at maximum speed.

\*   \*   \*   \*   \*